Aug. 23, 1927. Re. 16,712
W. S. CLOUD
PROCESS AND APPARATUS FOR MAKING CONFECTIONS
Original Filed May 2, 1923 3 Sheets-Sheet 1
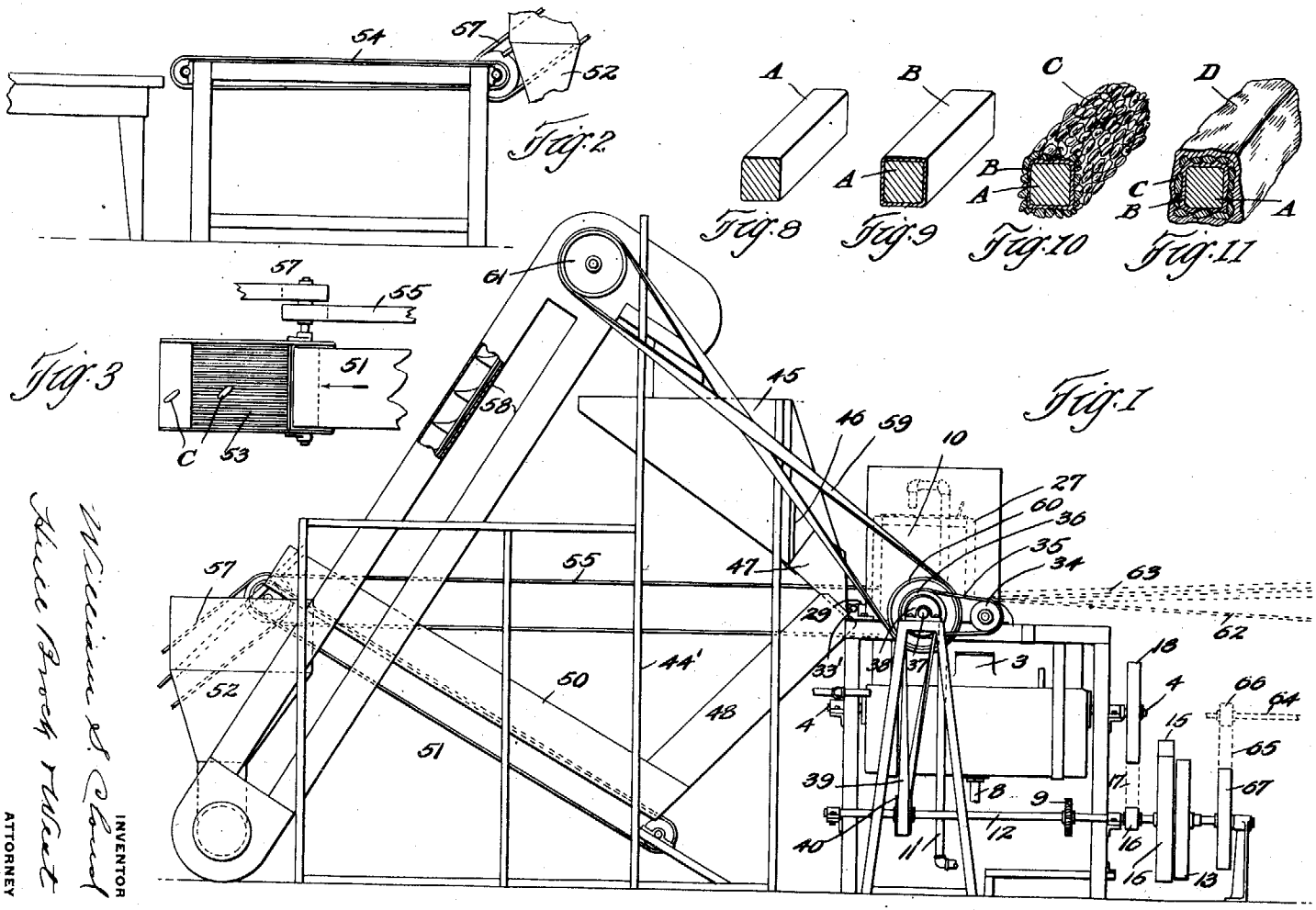
INVENTOR
William S. Cloud
Hull Brock & West
ATTORNEY Aug. 23, 1927. W. S. CLOUD Re. 16,712
PROCESS AND APPARATUS FOR MAKING CONFECTIONS
Original Filed May 2, 1923 3 Sheets-Sheet 2
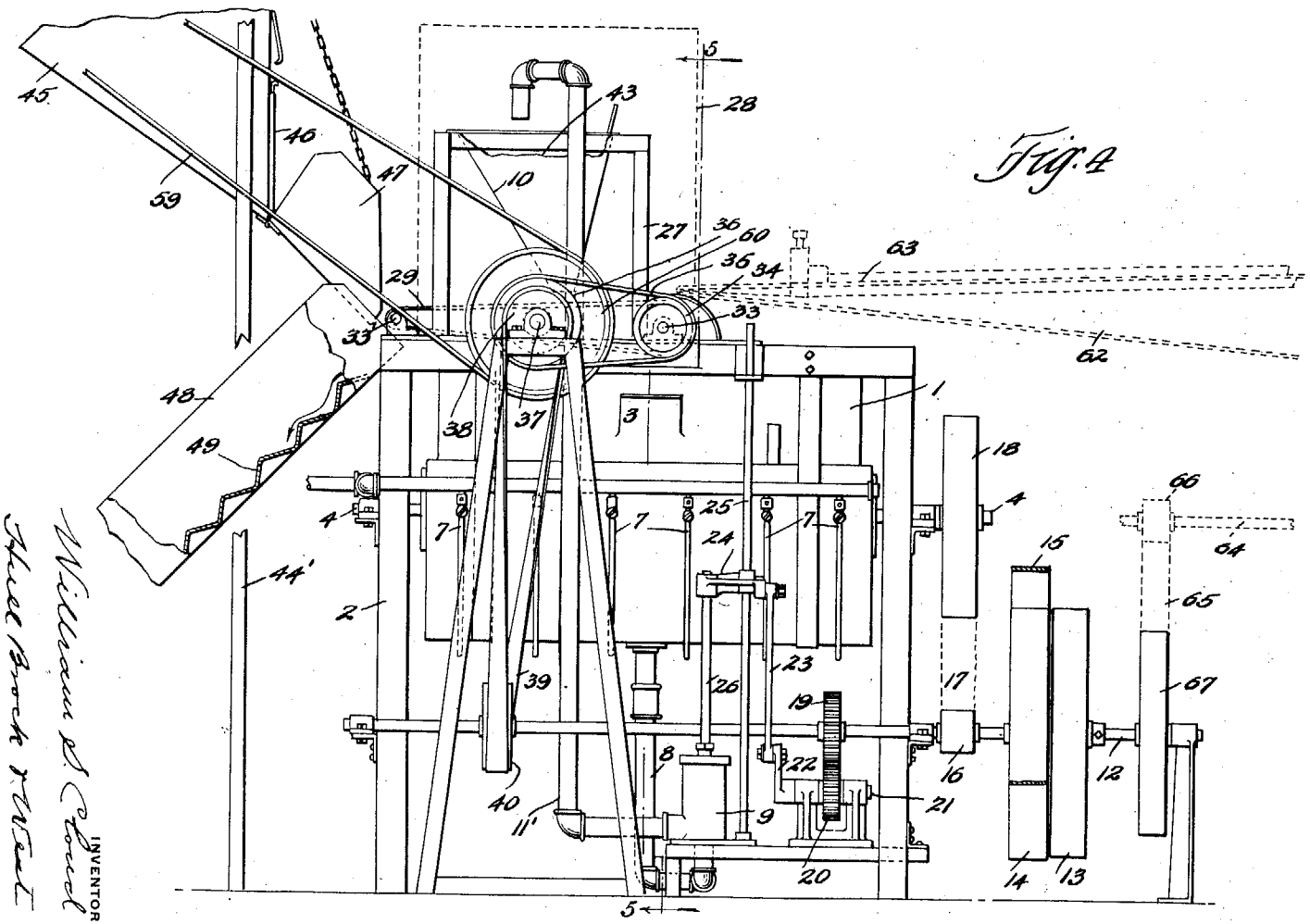
INVENTOR
William S. Cloud
Hull Brock & West
ATTORNEY Aug. 23, 1927. W. S. CLOUD Re. 16,712
PROCESS AND APPARATUS FOR MAKING CONFECTIONS
Original Filed May 2, 1923 3 Sheets-Sheet 3
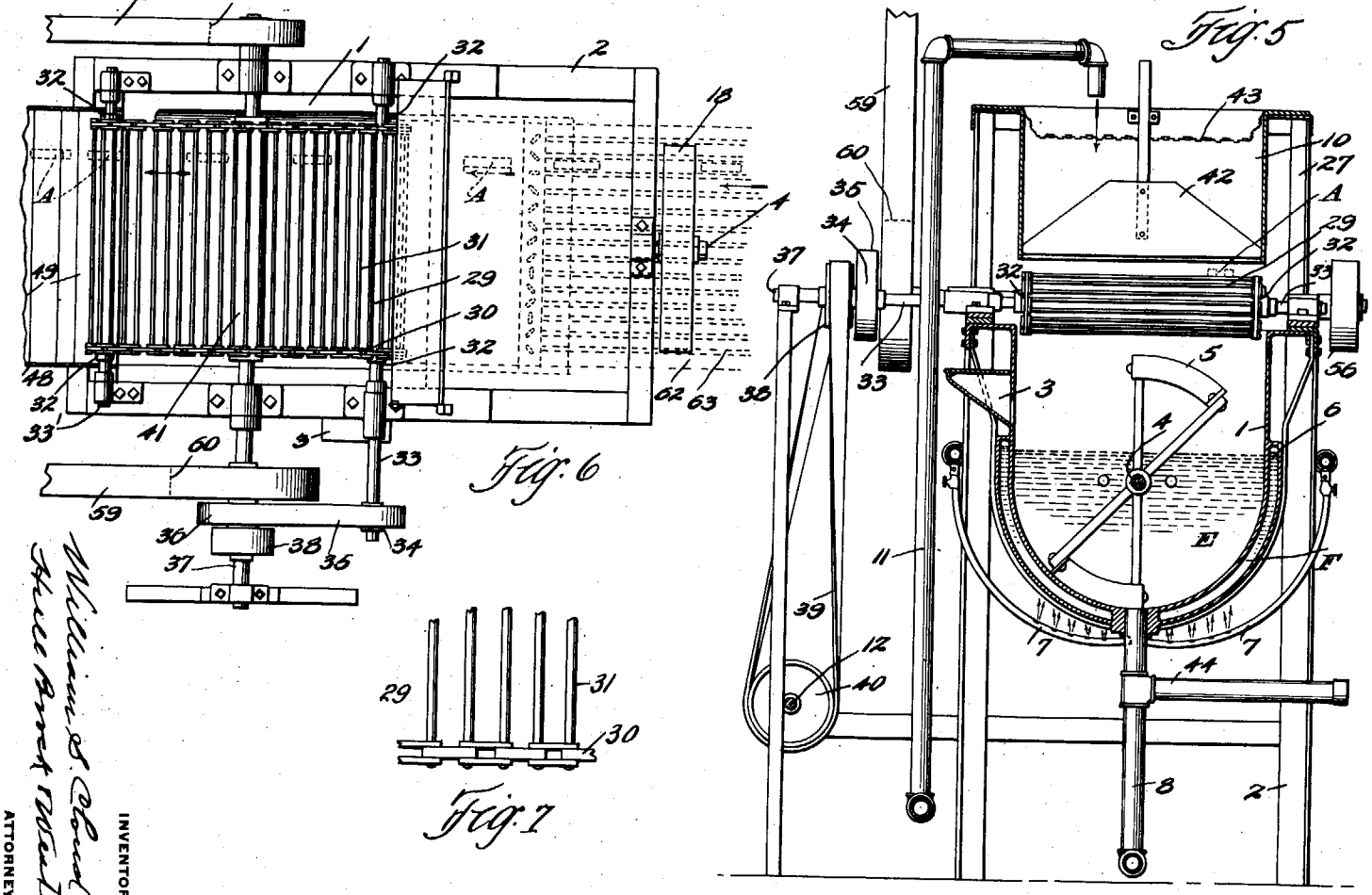
INVENTOR
William S. Cloud
Hill Brock & West
ATTORNEY Reissued Aug. 23, 1927. Re. 16,712

UNITED STATES PATENT OFFICE.

WILLIAM S. CLOUD, OF BERKELEY, CALIFORNIA.

PROCESS AND APPARATUS FOR MAKING CONFECTIONS.

Original No. 1,462,883, dated July 24, 1923, Serial No. 636,071, filed May 2, 1923. Application for reissue filed February 19, 1927. Serial No. 169,640.

This invention has reference to a process and apparatus for making confections.

There are certain types of confections, which are now and for sometime have been very popular, such for instance as "milk-nut roll"—"pecan roll"—"cocoanut roll"—"raisin roll" and the like; all preferably made with a suitable center covered with caramel or other material, the nuts or raisins, with a finishing coating of chocolate, if desired. So far as I am aware all such confections have been made by hand, or hand dipped, which is both inconvenient and expensive, making it difficult to produce the article in a five-cent piece, which has proven to be the most desirable, from a sales viewpoint. These pieces have a certain specified weight and it is therefore obvious that control must be had of each of the component parts of the piece and that weights of the ingredients and temperatures of the coverings, such as caramel and chocolate enter largely into the ultimate cost of the finished article. Hand-dipping requires not only a cooling room adequate for the number of employees necessary, together with a large number of expensive scales to weigh the individual pieces, but because of the difficulty experienced in handling the caramel and the dipping of the individual centers therein and removal of the same, which practically prevents the control of the heat of the caramel, it has proven difficult to produce by hand dipping an inexpensive piece. By the use of my process and apparatus, the cooling room and scales for weighing the individual pieces, as they are covered with nuts, cocoanut or raisins have been eliminated; the temperature of the caramel controlled, and the covering of the caramel coated centers uniformly covered with nuts, cocoanut or raisins, so that all the articles are made substantially alike and substantially the same weight. Furthermore, handling of the pieces by hand is to a large extent done away with and production is increased many, many times.

My invention comprehends an apparatus for enrobing or covering the candy centers with plastic material such as caramel, fondant or icing and then passing the coated or enrobed centers through a shower of units of suitable materials, such for instance as nuts, cocoanut, raisins or the like which will adhere to the coating as the seam comes into contact therewith; the articles being caused to move with the surplus nuts, cocoanut, raisins or the like and to be tumbled about so that the entire coated surface of the articles shall be covered. The finished or semi-finished articles, as the case may be, are conveyed from the apparatus, and the surplus and unused nuts, cocoanut, raisins or the like are conveyed to a point for a reshowering of further centers. The process being continuously carried on, as will be inferred. By the use of the terms "finished" or "semi-finished", articles, I mean articles which are finished with a covering of nuts, cocoanut, raisins or the like, or after the nuts, cocoanut, raisins or the like have been put on, then covered with a finishing coating or covering of chocolate. I have not shown nor do I include the chocolate finishing step, as it forms no part of this invention, being done by the ordinary and well known enrobing machines used by manufacturers of candies and confections for many years.

That the invention may be more fully understood, reference is had to the accompanying drawings, forming a part of this application, illustrating a preferred embodiment of apparatus, in which Fig. 1 is a side elevation of an apparatus embodying my invention, suitable for the carrying out of my improved process, parts being broken away, and the feeding means to the caramel coating or covering means, being partly shown in dotted lines; Fig. 2 is a side elevation of a part of the apparatus and would extend from the left hand end of Fig. 1; Fig. 3 is a partial plan view of the delivery end of Fig. 1; Fig. 4 is a detail in side elevation of the caramel coating means, nut, cocoanut or raisin delivering means and tumbling means; Fig. 5 is a vertical sectional view, as the same would appear on the line 5—5 of Fig. 4, with the feeder or distributing hopper for the caramel in section; Fig. 6 is a detail in plan showing the conveyor for the candy centers, located below the caramel distributing hopper; Fig. 7 is a detail of the conveyor shown in Fig. 6; Figs. 8, 9, 10 and 11 show respectively, in detail and in section, the candy center, as coated with caramel, as covered with nuts and then covered with a chocolate covering.

Like characters of reference denote corresponding parts throughout the figures.

To a full and complete understanding of the use of the process and apparatus, reference will be first made to the confection to be produced. In Fig. 8 there is shown a candy center or core A, which may be soft, semi-hard or hard, as may be desirable. This core forms the base to be covered with caramel, then nuts, cocoanut or raisins, and finally covered with a coating of chocolate, if desired. Fig. 9 shows the core A, enrobed or covered with a caramel coating B. Fig. 10 shows the caramel coated core or center coated with nuts C. Ordinarily the pieces are made with peanuts and the final article covered, coated, or enrobed with a chocolate coating D. Such an article is then sold as a "milk-nut roll". Instead of peanuts, pecans, raisins or cocoanut could be used. Usually when the caramel coated core is covered with pecans, the article is sold as a "pecan-roll" without the final chocolate covering. It should therefore, be apparent that the character of the finished confection may vary in accordance with the wishes of the manufacturer and demands of the trade.

In the drawings, the caramel E is contained within a jacketed heated tank or receptacle 1, supported by a suitable frame work 2, an inlet 3 being provided on the tank through which the caramel is poured into the tank. Said tank has preferably a round bottom, and revoluble in the tank on a shaft 4, is an agitator scraper 5 adapted to keep the caramel in agitation and scraped from the wall of the tank, so that all of the caramel may be uniformly heated and kept in the desired liquid state and temperature. Within the jacket 6 of the tank is oil F, heated by suitable burners 7 supplied with fuel from a suitable source of supply. Said burners heat the oil and in this manner uniformly apply heat to the wall of the tank to heat the caramel. Caramel coating is much thicker and stickier than chocolate and therefore much harder to handle, but very easily and conveniently handled by the means herein described and also very easily controlled. A feed pipe 8 leads from the bottom of the tank 1 to a suitable pump 9, and connected with said pump and leading to a feeder or distributing hopper 10 is a feed pipe 11. The pump which draws the heated caramel from the tank 1 and pumps it to the hopper 10 is operated as follows: 12 designates a driving shaft having a tight and loose pulley wheel 13 and 14 thereon to be connected by a belt 15 leading to a suitable source of power. To said shaft is connected a small pulley wheel 16 operating a belt 17 driving a larger pulley wheel 18 on the agitator scraper shaft 4 in the tank 1. Also on said shaft 12 is secured a gear wheel 19 meshing with a gear wheel 20 carried on a shaft 21 to which is connected a crank 22 connected with a pitman bar or rod 23, in turn connected to a cross-head 24 movable up and down on a guide-rod 25. And to the cross-head 24 is connected the pump actuating rod 26, see Fig. 4.

The feeder or distributing hopper 10 for the caramel is preferably suspended from a super-structure 27, located above and at the inner end of the frame 2 within which is supported the tank 1, and said hopper 10 and structure 27 may be enclosed or covered by a removable frame-covering 28. Below the hopper 10 and above the open upper portion of the tank 1 is a conveyor 29, best seen in Figs. 5 and 6. Said conveyor preferably lies above the rear half portion of the tank 1, as shown. I prefer to construct the conveyor 29 in the manner shown in Figs. 6 and 7. It includes preferably, the endless side chains 30 connected by the transversely disposed rods 31 spaced at suitable distances apart and on which rest and are moved the candy centers or cores A, as shown in dotted lines in Fig. 6. The opposite chains 30 travel over sprocket wheels 32 carried on a driving shaft 33 at the front end and shafts 33′ at the rear end. On the shaft 33 is carried a pulley wheel 34 operated by a belt 35 from a pulley wheel 36 on a cross-shaft 37 to which is secured a pulley wheel 38 operated by a belt 39 from a pulley wheel 40 on the driving shaft 12. It is to be observed that the shafts 33′ do not cross within the conveyor 29, but that the shaft 37 does, it being preferably located approximately midway the length of the conveyor 29 and just to the rear of the lower discharge end of the hopper 10, see Fig. 4. On the shaft 37 is a roller or drum 41 with which the upper run of the conveyor rods 38 contact. It is desirable and important that there be no obstructions within the conveyor 29, at the rear end, which would be the case if the shafts 33′ were carried through. This prevents carriers for the caramel and does away with obstructions which would otherwise prevent a free drip of the surplus caramel back into the tank 1. Also the drum or roller 41 midway the conveyor and just to the rear of the lower discharge end of the hopper 10 will catch the drip of the caramel and provide for the complete enrobing of the candy centers or cores A as they are moved beneath the hopper 10 and across the drum or roller 41. The rear or discharge end of the conveyor 29 is at the rear end of the tank 1 and frame 2, see Fig. 4.

The conveyor structure 29 and its location in relation to the tank 1 is somewhat similar to like structures in well known types of candy enrobing machines, except that the present conveyor is more of an open type, as explained, and it travels faster so as to insure a complete throw-off of the caramel coated centers or covers where they pass through the shower of nuts, cocoanut or raisins into the tumbler.

The feeder or distributing hopper 10 lies above and across the full width of the conveyor 29, see Fig. 5 and is provided with a controllable shutter 42 adjustable up and down on the inside of the front wall of said hopper 10, to control the flow of the caramel therefrom, discharged thereinto from the the feed pipe 11. Said hopper is further provided with a screen 43, at or near its upper end through which the caramel must pass into the hopper and is for the purpose of intercepting heavy particles and extraneous matter which might clog or tend to clog the outlet at the bottom of the hopper, controlled by the shutter 42. A drain pipe 44 for the tank 1 is provided connected with the pipe 8, see Fig. 5.

44′ designates a frame work in which is supported a hopper 45 having a valve regulated outlet 46, and adjustably suspended in front of said hopper and adapted to receive and direct the discharge of materials therefrom, is a spout 47. The discharge end of said spout is adjustable across the path of discharge of the caramel coated centers or cores A from the conveyor 29 as they are fed to the tumbler chute or conveyor 48 supported at an inclination downwardly and rearwardly from the discharge end of the conveyor 29, see Figs. 1 and 4. The hopper 45 contains the nuts, cocoanuts, raisins or the like, providing the covering for the caramel coated centers A, and when the valve 46 is raised the materials are fed by gravity from the hopper 45 into the chute 47 and from the chute into the upper end of the tumbler chute or conveyor 48. The bottom of the latter is stepped, as shown at 49, Fig. 4, whereby as the caramel coated centers A after passing through the shower of material discharged from the spout 47 will tumble and turn, at the same time move in the direction of the flow of the material through the chute or conveyor and insure the material adhering to the exposed caramel surfaces of the centers, not covered as said centers pass through the shower of material from the spout 47. Connected to the lower end of the chute or conveyor 48 is an upwardly inclined chute 50 through which moves an endless conveyor 51. This conveyor receives the materials flowing down through the chute 48, as well as the covered caramel coated centers, in which the latter tend to roll as they are conveyed to the upper end of the chute 50 and further insure a complete covering of the exposed caramel surfaces of the centers. Between the shower of material from the spout 47 and the passage of the caramel coated centers in the tumbler 48, and as they are conveyed upwardly through the chute 50 it will be apparent that all the exposed surfaces of the caramel coated centers will collect materials for covering. At the discharge end of the chute 50 is a hopper 52 covered by a grid 53, see Fig. 3. The covered centers and surplus material from the conveyor 51 will be discharged onto this grid, the materials passing through the grid into the hopper and the covered centers passing over the grid and being discharged onto the conveyor table 54, see Fig. 2, or like member, by means of which the "finished" or "semi-finished" articles, as the case may be, may be delivered to a desirable point. If the covered articles are to be enrobed or coated with a coating of chocolate, they will be passed from the conveyor table to a suitable enrobing machine. The conveyor 51 is operated by a belt 55 from a pulley wheel 56 on the cross-shaft 37, see Fig. 6 and the conveyor table 54 is operated from the belt 55 through a belt 57 arranged and operated in the manner seen in Figs. 1, 2 and 3. I provide for the return of the surplus material deposited in the hopper 52, to the hopper 45. This is accomplished through and by means of an endless cup elevator 58 arranged to receive the discharge of the material from the hopper 52 and convey it to and discharge the same into the hopper 45. Said cup conveyor being driven by a belt 59 operated by a pulley wheel 60 on the cross-shaft 37 and operating a pulley wheel 61 connected to the head end of the cup elevator, see Fig. 1.

The candy centers or cores A are delivered to the conveyor 29 of the apparatus by means of a well known type of conveyor 62, seen in dotted lines Figs. 1, 4 and 6 overlying which are a plurality of adjustable guides 63, between which the centers are laid on the conveyor, see Fig. 6 and conveyed endwise onto the conveyor 29; said centers being received cross-wise of the rods 38 of the conveyor, and conveyed endwise through the flow of the caramel from the hopper 10 and thrown-off of the conveyor endwise through the shower of material discharged from the spout 47. The conveyor 62 may be driven from the driving shaft 12 in any suitable manner through a shaft 64 operated by a belt 65 engaging a pulley wheel 66 operated by a pulley wheel 67 on said shaft 12. The shaft 64, pulley wheel 66 and belt 65 being shown in dotted lines in Figs. 1 and 4.

The chutes 48 and 50, the hopper 52, grid 53 and cup elevator are all suitably supported from the frame work 44, as shown.

Having thus described my invention, what I claim is:—

1. In an apparatus of the character described, the combination with a tank for containing a coating material, of a distributing hopper arranged above said tank and means for conveying the material from the tank to the hopper, an endless conveyor arranged beneath the hopper and above the tank, said conveyor having transversely extending rods, a member extending between the conveying flights of the endless conveyor and with which the upper flight of said conveyor contacts, means for driving said conveyor at a predetermined speed and means for feeding articles to be coated to said conveyor, means for carrying away said coated articles from the conveyor, said conveyor having transversely extending rods spaced apart, the arc about which said conveyor turns at its delivery end being so proportioned with respect to the spacing of said rods and the speed of said conveyor that said centers will be disengaged from said conveyor at the delivery end thereof by centrifugal force.

2. In an apparatus of the kind described, the combination with a tank for containing a coating material, of a distributing hopper arranged above said tank together with means for moving the coating material from the tank to the hopper, an endless conveyor arranged beneath the hopper and above the tank, said conveyor having spaced apart transversely extending rods, a member arranged intermediate the ends of the conveyer between the flights thereof and with which the upper flight of the conveyor contacts, means for driving said conveyor, said conveyor being provided with transversely extending rods spaced apart, the spacing of said rods being so proportioned with respect to the speed of said conveyor that said centers will be disengaged therefrom at the delivery end by centrifugal force.

3. In an apparatus of the character described, the combination with a suitably heated tank for containing a coating material, of a distributing hopper arranged above said tank and means for moving the coating material from the tank to the hopper, an endless conveyor arranged beneath the hopper and adapted to convey candy centers, said conveyor having a plurality of transversely extending spaced apart rods, a member arranged intermediate the ends of the conveyor and between the flights thereof, the upper flight of said conveyor contacting with said member, a chute arranged adjacent the delivery end of the conveyor and downwardly inclined with respect to said conveyor and into which centers are discharged from said conveyor; and a hopper also discharging into the receiving end of the chute for the purpose specified.

4. In an apparatus of the character described, in combination, an endless conveyor, means for delivering a stream of preheated material to the upper side of said conveyor for completely enrobing centers of candy as they are moved beneath said stream of plastic material, a member extending beneath the upper flight of the conveyor adjacent the point of delivery of said stream, means for varying the rate of flow of said stream of material with respect to the speed of said conveyor to cause said plastic material to pile up to a height sufficient to cause said centers to be completely submerged in the plastic material as they pass beneath the flood point, means for completely enveloping said centers with edible units without discontinuing the movement of said centers from the time they are placed on said endless conveyor and means for separating said enrobed centers from the surplus edible units.

5. In an apparatus of the class described, in combination, an endless conveyor, means for delivering a stream of preheated material to the upper side of said conveyor in such a manner as to completely submerge the candy centers being moved across said stream by said conveyor, an inclined chute arranged adjacent the delivery end of said conveyor and into which the enrobed candy centers are delivered, means for delivering a shower of edible units into the upper end of said chute at a point immediately adjacent the point where said enrobed centers enter the chute, whereby the candy centers and edible units roll down said chute together in such a manner as to effect an intimate commingling of said centers and edible units and to thoroughly envelope all sides of said candy centers with edible units.

6. An apparatus as set forth in claim 5 in which the means for delivering the edible units is so disposed with respect to said inclined chute that the falling edible units change direction at an angle and in which the conveyor is so positioned with respect to said chute and stream of edible units that the centers are delivered into the stream of falling edible units at the point of change of direction of said stream of edible units.

7. In apparatus of the class described, in combination, an endless conveyor, means for delivering a stream of preheated coating material to the upper side of said conveyor for completely enrobing candy centers being moved across said stream, an inclined chute arranged adjacent the delivery end of said conveyor and into which the enrobed candy centers are delivered, means for delivering a shower of edible units into the upper end of said chute at a point immediately adjacent the point where said enrobed centers enter the chute, whereby the candy centers and edible units will fall down said chute together in such a manner as to effect an intimate commingling of said centers and edible units and to thoroughly enrobe said candy centers with edible units, said conveyor being driven at a speed to develop sufficient centrifugal force to throw said candy centers off of said conveyor into said shower of edible units.

8. An apparatus as set forth in claim 7 in which said conveyor is provided with transverse rods spaced apart so that said centers do not rest upon more than three of said rods and said rods being of small diameter as compared to the length of the centers whereby a minimum contact between said centers and rods is obtained, a member extending beneath the upper flight of the conveyor adjacent the point of delivery of said stream, the speed of said conveyor being so regulated with respect to the stream of plastic material as to cause said plastic material to pile up to a sufficient height to cause said centers to be completely submerged in the plastic material as they pass beneath the flood point and means for preventing said centers from floating off of said conveyor.

9. In an apparatus of the character described, in combination, a tank for containing coating material, a distributing hopper arranged above said tank and means for conveying the material from the tank to the hopper, an endless conveyor arranged beneath the hopper and above the tank, said hopper being of such size and so positioned with respect to said conveyor as to deliver a stream of said coating material across the upper side of said conveyor, a member extending beneath the upper flight of the conveyor adjacent the point of delivery of said stream, means for varying the rate of flow of said stream of plastic material with respect to the speed of said conveyor to cause said coating material to pile up to a height sufficient to cause said centers to be completely submerged in the coating material as they pass beneath the flood point, an inclined chute disposed adjacent the delivery end of said conveyor and into which said enrobed centers are delivered, means for delivering a shower of edible units to the upper end of said chute adjacent the point of delivery of said centers, whereby said edible units and enrobed centers roll down said chute together, means for separating said enrobed centers from the surplus edible units.

10. In an apparatus of the class described the combination of an enrobing machine having a source of supply of coating material, an endless conveyor, means for delivering a stream of coating material to the upper side of said conveyor for enrobing candy centers as the same are being conveyed, a member extending beneath the upper flight of said conveyor adjacent the point of delivery of said stream, means for regulating the rate of flow of said stream of coating material so that the same is caused to pile up to a height sufficient to cause said candy centers to be completely submerged as the same pass through the flood point, means for operating said conveyor, and means for completely enveloping said centers with edible units without discontinuing the movement of said centers from the time the centers are placed upon said conveyor.

11. In an apparatus of the class described, the combination of an enrobing machine having an endless conveyor, means for delivering a stream of coating material to the upper side of said conveyor for enrobing candy centers as the same are being conveyed and comprising a supply pipe, a feeder or distributing hopper extending transversely across said conveyor and into which said supply pipe delivers, a control shutter for varying the rate of flow through said feeder, a member extending beneath the upper flight of said conveyor adjacent the point of delivery of said stream, said control shutter being disposed in close proximity to and above the point of entrance of said centers into the stream whereby the downward force of the flow is sufficient to prevent said centers from floating and to submerge said centers as they pass through the flood point, means for completely enveloping said centers with edible units without discontinuing the movement of said centers from the time the centers are placed upon said conveyor, means for separating the enveloped centers from the surplus edible units and means for driving said conveyor at sufficient speed to throw the centers off of the delivery end of said conveyor by centrifugal force.

12. An apparatus as set forth in claim 10 in which said conveyor is provided with transversely extending rods or bars so spaced apart that the candy centers do not rest on more than three bars and in which said conveyor is driven at sufficient speed to throw said centers off of the conveyor when they reach the delivery end thereof.

13. An apparatus as set forth in claim 10 in which said conveyor is provided with transversely extending rods or bars spaced apart and in which the speed of said conveyor is so proportioned with respect to the spacing of said bars that said centers will be disengaged from said conveyor at the delivery end thereof by centrifugal force.

14. An apparatus of the class set forth in claim 10 in which said conveyor is made up of a plurality of transversely extending bars or rods spaced apart and in which the arc about which said conveyor turns at its delivery end is so proportioned with respect to the speed of the conveyor as to cause said centers to be disengaged from said conveyor at the delivery end thereof by centrifugal force.

15. In an apparatus of the class described, in combination, means for moving candy centers comprising an endless conveyor and means for driving the same, of means for delivering a stream of preheated coating material to the upper side of said conveyor, a member extending beneath the upper flight adjacent the point of delivery of said stream and with which said upper flight contacts, means for regulating the rate of flow of said coating material with respect to the speed of the conveyor so that said centers will be submerged as they pass beneath the flood point, means for driving such conveyor at such a speed that said centers will be dislodged from said conveyor at the delivery end thereof by centrifugal force, means for showering said enrobed centers with edible units during the movement of said centers, tumbling means for effecting an intimate commingling of said enrobed centers and edible units so as to completely envelop said centers with edible units, and means for separating said enveloped centers from the excess edible units.

16. In an apparatus of the class described, in combination, means for moving candy centers, means for enrobing said centers with a coating of plastic material as they are moved and comprising an endless conveyor, means for delivering the stream of preheated coating material to the upper side of said conveyor, a distributing hopper arranged above said conveyor and extending transversely thereof and into which said stream of plastic material is delivered, a member extending beneath the upper flight of said conveyor adjacent the point of delivery of said stream, a control shutter for regulating the rate of flow through said distributing hopper, said control shutter being disposed above and in close proximity to the point of entrance of said centers into the stream whereby the downward force of the flow is sufficient to prevent said centers from floating and to submerge said centers as they pass beneath the flood point, and means for enveloping the enrobed centers with edible units without discontinuing the movement of the same.

17. The process of coating candy centers and enveloping said coated centers with edible units, which consists in continuously moving said centers and delivering a stream of coating material to the moving centers in such a manner as to completely submerge said centers in the coating material to completely enrobe the same; thence throwing said enrobed centers into a shower of edible units and rolling said enrobed centers and edible units down an incline to completely envelop said centers on all sides with edible units; and finally separating the enveloped centers from the surplus material without arresting the movement of said enveloped centers.

18. The process of coating candy centers and enveloping the same with edible units which consists in continuously moving said centers and completely enrobing the same with a layer of coating material, thence throwing the enrobed centers into a shower of edible units and rolling the enrobed centers and edible units simultaneously down an incline to cause the edible units to adhere to the layer of coating material and finally separating the enveloped centers from the surplus edible units, all of the above operations being carried out without arresting the movement of the centers.

19. The process of coating candy centers and enveloping the same with edible units which consists in moving said centers and completely enrobing the same on all sides with a layer of coating material, thence throwing said enrobed centers into a shower of edible units and tumbling said centers and edible units to cause the edible units to adhere to the layer of coating material and finally separating the surplus edible units from the enveloped centers, all of the above mentioned operations being carried out without arresting the movement of the centers.

WILLIAM S. CLOUD.